United States Patent
Jin et al.

(10) Patent No.: US 12,267,924 B2
(45) Date of Patent: Apr. 1, 2025

(54) BLEEDER CURRENT CONTROL CIRCUIT, CONTROL METHOD AND DISTORTION SIGNAL PROCESSING METHOD

(71) Applicant: Shenzhen Kiwi Instruments Corporation, Shenzhen (CN)

(72) Inventors: Weixiang Jin, Shenzhen (CN); Xiufeng Yu, Shenzhen (CN); Guanqiu Lin, Shenzhen (CN)

(73) Assignee: Shenzhen Kiwi Instruments Corporation, Shenzhen (CN)

( * ) Notice: Subject to any disclaimer, the term of this patent is extended or adjusted under 35 U.S.C. 154(b) by 263 days.

(21) Appl. No.: 17/951,903

(22) Filed: Sep. 23, 2022

(65) Prior Publication Data

US 2023/0028719 A1    Jan. 26, 2023

(30) Foreign Application Priority Data

Sep. 24, 2021  (CN) .......................... 202111121886.1

(51) Int. Cl.
  *H05B 45/3575*  (2020.01)
  *H02M 1/00*    (2006.01)
  *H05B 45/345*  (2020.01)

(52) U.S. Cl.
  CPC ...... *H05B 45/3575* (2020.01); *H02M 1/0085* (2021.05); *H05B 45/345* (2020.01)

(58) Field of Classification Search
  CPC .......................... H05B 45/3575; H05B 45/345
  See application file for complete search history.

(56) References Cited

U.S. PATENT DOCUMENTS

| | | | |
|---|---|---|---|
| 8,829,819 B1* | 9/2014 | Angeles | H05B 45/375 |
| | | | 315/308 |
| 9,559,675 B1* | 1/2017 | Peng | H05B 45/3725 |
| 9,769,901 B1* | 9/2017 | Vaughan | H05B 45/3575 |
| 11,343,887 B2* | 5/2022 | Li | H05B 45/14 |
| 2016/0134187 A1* | 5/2016 | Pregitzer | H02M 3/156 |
| | | | 323/285 |
| 2018/0115234 A1* | 4/2018 | Liu | H05B 45/3575 |

(Continued)

FOREIGN PATENT DOCUMENTS

| | | | | |
|---|---|---|---|---|
| CN | 105142260 A | * | 12/2015 | |
| CN | 106332374 A | * | 1/2017 | ............. H02M 1/00 |

(Continued)

*Primary Examiner* — Sisay G Tiku
(74) *Attorney, Agent, or Firm* — NZ Carr Law Office (57) ABSTRACT

A bleeder current control method. The bleeder current control method includes the following steps: The rectifier bridge transmits a post-bridge input signal to the power system. The shaping circuit obtains the post-bridge input signal and shapes it into a bleeder current reference signal, the bleeder current reference signal is inversely correlated with the initial post-bridge input signal. Acquiring a current sampling signal representing the bleeder current, and comparing the error of the current sampling signal with the bleeder current reference signal to obtain an error signal. The current sampling signal is controlled according to the error signal, so that the current sampling signal is output based on the waveform of the bleeder current reference signal. Thus, a reliable and full-time sine wave envelope signal is provided to the power system, so as to reduce the loss caused by the bleeder current to the power system.

9 Claims, 5 Drawing Sheets

(56) References Cited

U.S. PATENT DOCUMENTS

| | | | | |
|---|---|---|---|---|
| 2018/0295690 A1* | 10/2018 | Chen | ................ | H05B 47/10 |
| 2019/0082507 A1* | 3/2019 | Zhu | ................ | H05B 45/31 |
| 2020/0236756 A1* | 7/2020 | Wang | ................ | H05B 45/3575 |
| 2021/0321501 A1* | 10/2021 | Zhu | ................ | H05B 45/355 |

FOREIGN PATENT DOCUMENTS

| | | | |
|---|---|---|---|
| CN | 110286706 | | 9/2019 |
| CN | 210072436 | | 2/2020 |
| CN | 211930937 U | * | 11/2020 |

\* cited by examiner

FIG. 6

BLEEDER CURRENT CONTROL CIRCUIT, CONTROL METHOD AND DISTORTION SIGNAL PROCESSING METHOD

CROSS-REFERENCE TO RELATED APPLICATIONS

This application claims priority to and the benefit of Chinese Patent Applications No. 202111121886.1, filed on Sep. 24, 2021, which is incorporated herein by reference in its entirety.

TECHNICAL FIELD

The invention relates to the field of electronic information, in particular to a bleeder current control circuit, control method and distortion signal processing method.

BACKGROUND

In the ACDC power system, there is a power system without the post-bridge capacitance that is, in the ideal state, the output signal after the bridge is a sinusoidal steamed bread waveform. The biggest advantage of this type of power system is that electrolytic capacitors are omitted, which helps to reduce the size of the power system and prolong its life. The general power system has a variety of ways to use this steamed bread waveform, such as taking the peak energy to transfer to the rear stage (generally used in high-power systems, such as biscuit power supply, etc.), and also taking the valley-bottom chopping energy to transfer it to the rear stage (such as low-power systems, the valley-bottom chopping energy is transferred to the subsequent stage for energy transmission).

Figure 1:
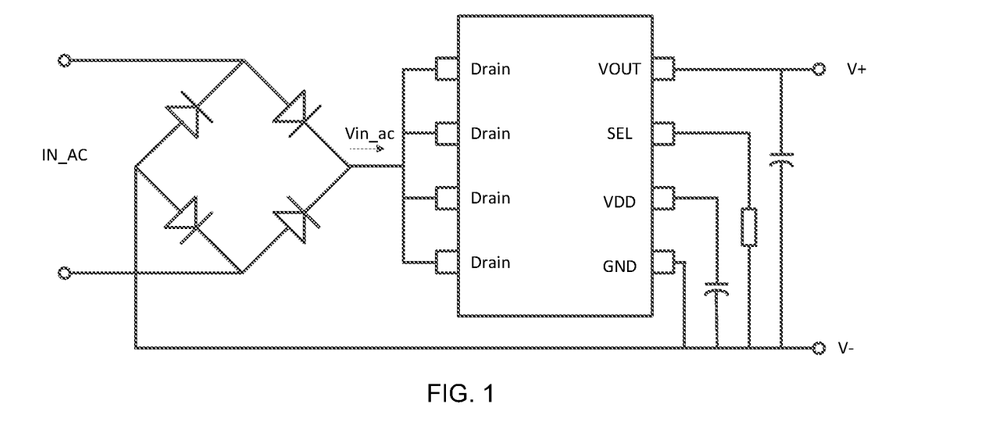
FIG. 1 illustrates a schematic diagram of a power system with no post-bridge capacitance, valley-bottom chopper to transfer energy, and post-stage stage LDO constant voltage.

FIG. 1 is a system with no post-bridge capacitance, valley-bottom chopper to transfer energy, and post-stage LDO constant voltage. As shown in FIG. 1, in systems where low-power valley-bottom chopper transfers energy, due to the need for high-voltage chopper to transfer energy, the chip needs to accurately detect the real-time situation of the steamed bread waveform after the bridge; then, by judging the real-time situation of the steamed bread wave waveform after the bridge, it is decided whether to open the supervisor in the lower valley-bottom voltage range of the current power frequency cycle, so as to decide whether to transmit energy to the capacitor at the VDD terminal. However, in practical applications, the steamed bread waveform after the bridge is not always an ideal sinusoidal envelope, but due to the existence of parasitic capacitance between the Drain terminal and the ground, the lower the voltage, the more distorted the sinusoidal envelope.

In the power system, to solve the problem of valley-bottom voltage waveform distortion caused by the parasitic capacitance of Drain terminal to ground, the existing traditional solutions are: On the Drain-GND path, a weak bleeder current is given inside the chip. The bleeder current flows from the Drain terminal to the GND terminal inside the chip. The ultimate goal is to discharge the parasitic capacitance of the Drain-GND, so that the voltage obtained by the Drain terminal can follow the input in a more sinusoidal shape.

Here, the current that drains the drain-GND parasitic capacitor is referred to as the BLEED CURRENT. Although the bleeder current can clean up the parasitic voltage and make the waveform sinusoidal, there is still a major drawback, that is, heat loss. The disadvantages of this heat loss are reflected in the experience of those in the art as follows: The bleeder current needs to be at the milliamp (mA) level to effectively discharge the valley-bottom parasitic capacitance, but the loss generated by the milliamp (mA) level current in the full power frequency cycle range of "low voltage exceeding 100 mW/100 Vac, high voltage exceeding 100 Vac "200 mW/220 Vac".

Among them, in view of the drawbacks brought by the use of the bleeder current, the prior art is to optimize the bleeder current by adjusting the time. That is, in the following way: by judging the sine wave with a regular power frequency of 50/60 hz, the peak value of the steamed bread wave is skipped, and the bleeder current is turned on at a lower voltage; "At lower voltage" selection position should not be too low, otherwise the voltage may not be seen due to parasitic voltage underpinning; Then through time judgment or cycle judgment, the bleeder current is turned on and off at a relatively low input voltage cyclically, so as to help the chip better monitor the sinusoidal input voltage waveform. However, this method does not directly judge the Drain terminal voltage, but relies on the period or power frequency to predict the envelope of the steamed bread wave, which makes it possible to reduce a lot of losses, but there may be certain risks in actual use.

In addition, in a power system that does not require a zero-crossing signal, such as the KP3310 chip, the bleeder current will not work in real time and for a long time, but will be selectively enabled according to the level of the power voltage at the VDD terminal, where the power voltage at the VDD terminal is the energy storage unit after the chopper. However, the power supply voltage of the VDD terminal will be affected by the lightness of the load. When the load is light, the power supply voltage of the VDD terminal is always at a high voltage, and the bleeder current at this time will not be enabled for a long time. That will make the chip unable to give an accurate zero-crossing signal during the power frequency period when the bleeder current is disabled for a long time. This also cannot fully realize the function of giving the full-time zero-crossing signal.

To sum up, for the power system without post-bridge capacitance, the traditional method of bleeder current to obtain the input signal of the complete steamed bread wave form has the disadvantage of large heat loss. The method of opening the bleeder current only at the valley-bottom voltage position of the steamed bread wave of the input signal has the disadvantage that the envelope of the steamed bread wave cannot be accurately judged, so there is a risk. In addition, in the power frequency period when the bleeder current is disabled for a long time, the zero-crossing signal cannot be given in real time.

SUMMARY

In one embodiment, a bleeder current control method, which is used for processing an input signal input into a power system, the method comprising: providing a post-bridge input signal to the power system; shaping the post-bridge input signal into a bleeder current reference signal, wherein the bleeder current reference signal is inversely correlated with the post-bridge input signal; obtaining a current sampling signal representing a bleeder current, and comparing the current sampling signal with the bleeder current reference signal to obtain an error signal; controlling the current sampling signal according to the error signal, so that the current sampling signal follows the waveform of the bleeder current reference signal.

In another embodiment, a distortion signal processing method, which is used for processing an input signal in a distorted state by a power system, comprising: providing the rectifier bridge transmits the post-bridge input signal in the distorted state to the power system; the shaping circuit obtains the post-bridge input signal and shapes it into a bleeder current reference signal, and the bleeder current reference signal is inversely correlated with the post-bridge input signal; acquiring a current sampling signal representing the bleeder current, and comparing the error of the current sampling signal with the bleeder current reference signal to obtain an error signal; controlling the output of the current sampling signal according to the error signal, so that the current sampling signal is output in the waveform of the bleeder current reference signal; the current sampling signal is used to discharge the current of the parasitic capacitance, so as to obtain the post-bridge input signal in a state of no distortion.

And in yet another embodiment, a bleeder current control circuit, used in a power system, the bleeder current control circuit comprising: a switching transistor; a shaping circuit configured to obtain a post-bridge input signal input into the power system, and shape the post-bridge input signal into a bleeder current reference signal; a comparator having a first input terminal coupled to the shaping circuit, a second input terminal, and an output terminal coupled to a control terminal of a switching transistor; and a bleeder signal generating circuit coupled to the switching transistor to generate a current sampling signal for representing the bleeder current flowing through the switching transistor, and the current sampling signal is fed back to the second input terminal.

BRIEF DESCRIPTION OF THE DRAWINGS

Non-limiting and non-exhaustive embodiments are described with reference to the following drawings. The drawings are only for illustration purpose. Usually, the drawings only show part of the circuits/devices of the embodiments.

DETAILED DESCRIPTION

In order to make the purpose, technical solutions and advantages of the embodiments of the present invention clearer, the technical solutions of the embodiments of the present invention will be described clearly and completely below with reference to the accompanying drawings of the embodiments of the present invention. Obviously, the described embodiments are some, but not all, embodiments of the present invention. Based on the described embodiments of the present invention, all other embodiments obtained by those of ordinary skill in the art without creative work fall within the protection scope of the present invention.

Unless otherwise defined, technical or scientific terms used herein should have the ordinary meaning as understood by one of ordinary skill in the art to which this invention belongs. "First", "second" and similar words used in the patent application description and claims of the present invention do not denote any order, quantity or importance, but are only used to distinguish different components.

Embodiment 1

In the application of a power system without post-bridge capacitors, this embodiment discloses a bleeder current control circuit in order to solve the loss and risk problems caused by using traditional bleeder current to bleed parasitic capacitance. Using the bleeder current control circuit of this embodiment to restore the input signal in the post-bridge distortion state can reduce the loss caused by the bleeder current, and can provide a full-time sine wave envelope shape input signal. That is to say, the input signal has a complete positive steamed bread waveform, which makes each sine wave valley-bottom of the input signal obtained by the power system strictly follow the input to have a complete sine wave envelope shape. At the same time, it can also realize the accurate detection and real-time giving of the L/N input AC zero-crossing signal, so as to facilitate the control of the zero-crossing switch of the rear-stage relay or thyristor.

This embodiment is used to optimize the input signal transmitted by the rectifier bridge 400 to the power system, so that the input signal has a complete sine wave envelope shape. This embodiment is specifically applied to a power system that transmits energy by valley-bottom chopper, so that the input signal has a complete positive steamed bread waveform.

Figure 2:
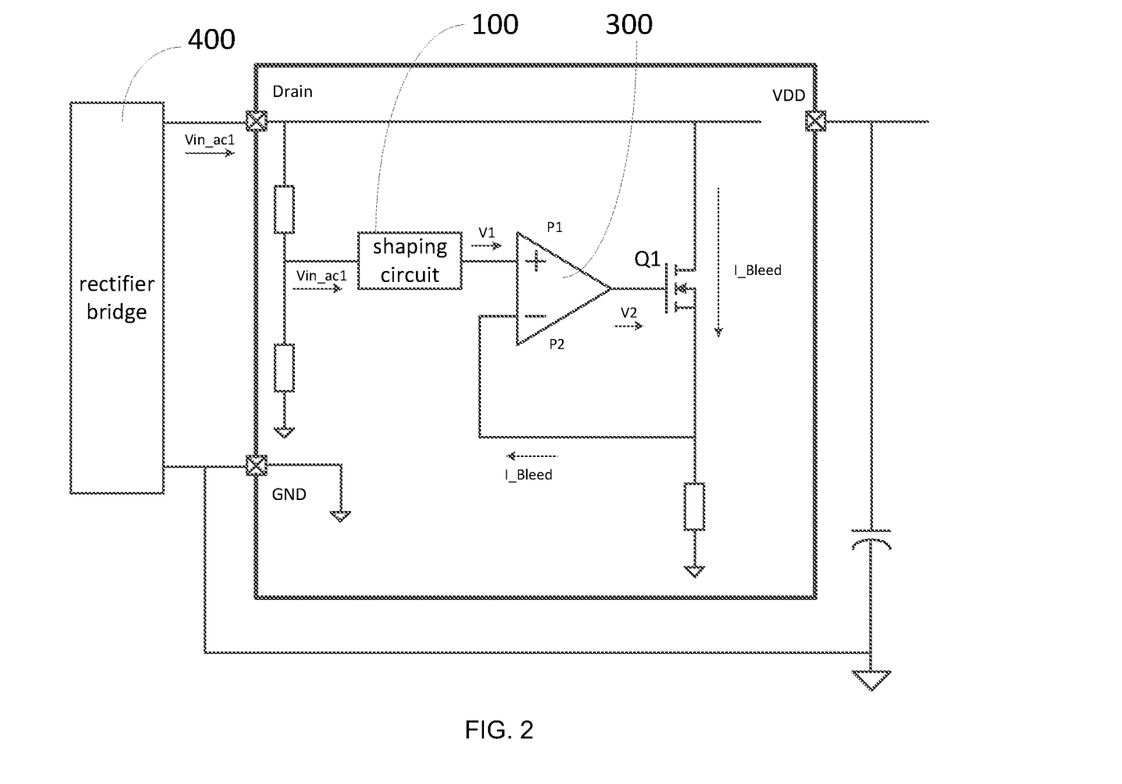
FIG. 2 illustrates a simplified schematic circuit diagram of a bleeder current controllable circuit in Embodiment 1.
Figure 3:
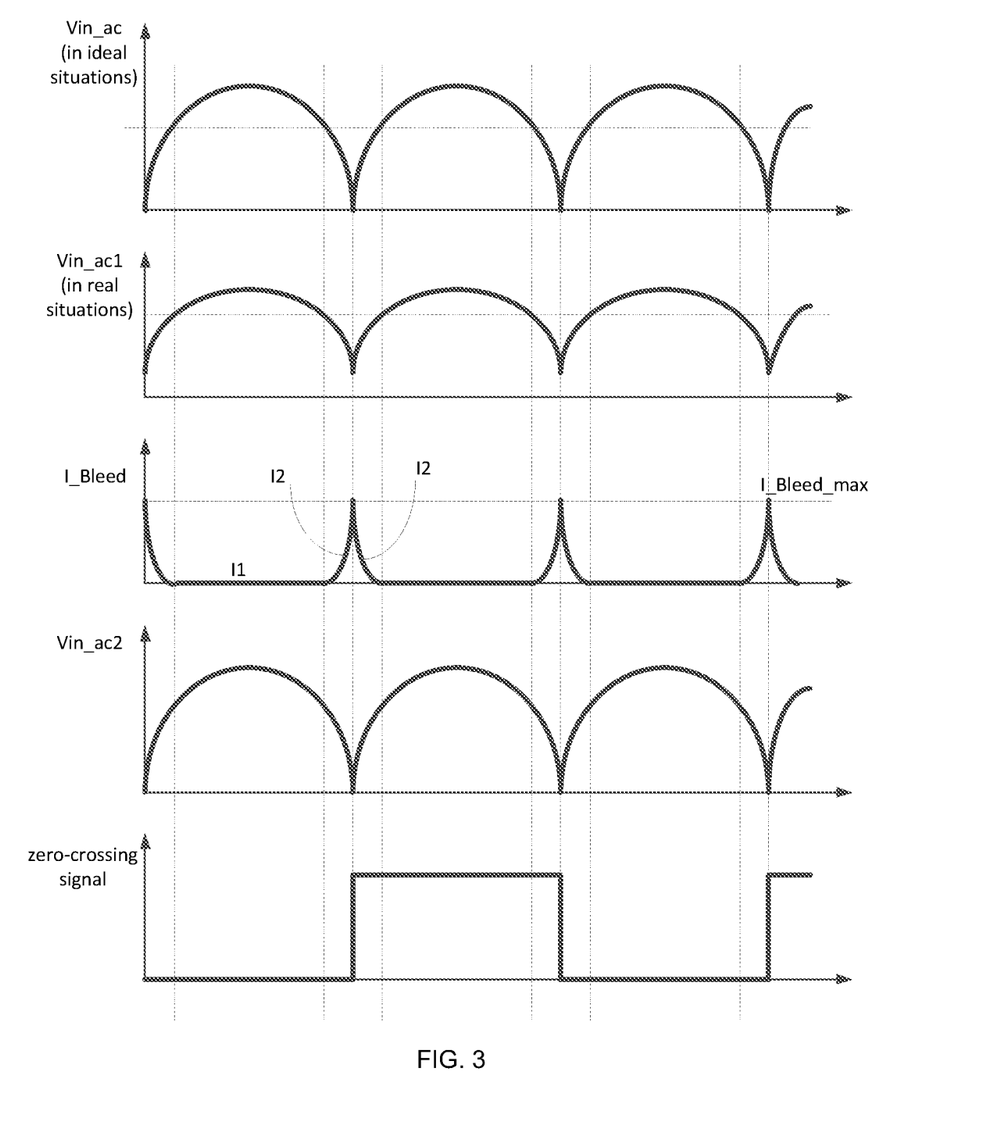
FIG. 3 illustrates a simplified schematic diagram of waveform changes of each signal in the Embodiment 1 and the Embodiment 2.

As shown in FIG. 2, this embodiment is applied to a power system without post-bridge capacitors, and specifically includes a shaping circuit 100, a comparator 300, a switching transistor Q1 and a bleeder signal generating circuit. It should be understood that the power system obtains the post-bridge input signal (i.e., Vin_ac1 in FIG. 2) from the rectifier bridge 400, which is obtained through the Drain terminal of the power system in this embodiment. The power system also includes a VDD terminal for obtaining the supply voltage, a GND terminal for grounding, and other functional ports. The functions of the ports of the power system belong to the conventional technical field, and therefore are not described in this embodiment. Wherein, the switching transistor Q1 in this embodiment is an NMOS transistor. In other embodiments, other suitable MOS transistors or BJT transistors may be selected according to actual circuit design requirements. In this embodiment, the bleeder current is characterized by the current sampling signal I_Bleed. In this embodiment, the bleeder current is characterized by the current sampling signal I_Bleed. FIG. 3 is a simplified schematic diagram of each waveform change after the current sampling signal I_Bleed acts on the post-bridge input signal (i.e., Vin_ac1 in FIG. 3) in this embodiment. As shown in FIG. 3, the ideal post-bridge input signal (i.e., Vin_ac in FIG. 3) is a positive steamed bread waveform with a complete sine wave envelope, but the actual post-bridge input signal (i.e., Vin_ac1 in FIG. 3) is a positive steamed bread waveform with a distorted valley-bottom and a non-complete sine wave envelope.

As shown in FIG. 2, the input terminal of the shaping circuit 100 is coupled to the Drain terminal of the power system, and obtains the post-bridge input signal (i.e., Vin_ac1 in FIG. 2) from the Drain terminal. The shaping circuit 100 is used for shaping the waveform of the post-bridge input signal, that is, shaping the waveform of the post-bridge input signal into a signal having an inverse correlation waveform with the post-bridge input signal. That is, the post-bridge input signal is output as the bleeder current reference signal V1 after being processed by the shaping circuit 100. The output terminal of the shaping circuit 100 is coupled to the first input terminal P1 of the comparator 300.

In this embodiment, the output terminal of the comparator 300 is coupled to the gate of the switching transistor Q1, and the source of the switching transistor Q1 is coupled to the second input terminal P2 of the comparator 300. In this embodiment, the first input terminal P1 of the comparator 300 is a non-inverting input terminal, and the second input terminal P2 is an inverting input terminal.

In this embodiment, the bleeder signal generating circuit generates the current sampling signal I_Bleed, and the current sampling signal I_Bleed flows through the switching transistor Q1 by coupling the bleeder signal generating circuit with the switching transistor Q1. The switching transistor Q1 feeds back the current sampling signal I_Bleed to the second input terminal P2 of the comparator 300. As shown in FIG. 2 and FIG. 3, after the comparator 300 compares the error between the current sampling signal I_Bleed and the bleeder current reference signal V1, the comparator 300 outputs an error signal V2. The error signal V2 is used to control the turn-on and turn-off of the switching transistor Q1, thereby controlling the output of the current sampling signal I_Bleed. When the error signal V2 is less than the conduction voltage drop of the switching transistor Q1, the switching transistor Q1 is not turned on, and the current sampling signal I_Bleed stops outputting; when the error signal V2 is not less than the conduction voltage drop of the switching transistor Q1, the switching transistor Q1 is turned on, and the current sampling signal I_Bleed is output. Therefore, after the error comparison of the comparator 300, the actual current sampling signal I_Bleed controlled and output by the switch Q1 maintains the waveform shown in FIG. 3. That is to say, the waveforms of the actual current sampling signal I_Bleed and the bleeder current reference signal V1 are consistent. It should be understood that the waveform of the bleeder current reference signal V1 refers to the waveform of the current sampling signal I_Bleed in FIG. 3.

In this embodiment, as shown in FIG. 3, the waveform of the current sampling signal I_Bleed forms an inverse correlation with the waveform of the post-bridge input signal (i.e., Vin_ac1 in FIG. 3). The current sampling signal I_Bleed is the first current value I1 having a small value within the range corresponding to the high-voltage interval of the post-bridge input signal. The first current value I1 of this embodiment is maintained at a stable current value with a tiny current. Wherein, the stable current value in this embodiment is selected as a tiny current value between 20 uA and 30 uA. In other embodiments, the stable current value can be selected from other specific values of a tiny current of tens of microamps according to actual needs. The current sampling signal I_Bleed is the second current value I2 with a large value within the range corresponding to the low-voltage interval of the post-bridge input signal, and increases as the post-bridge input signal decreases.

In this embodiment, for convenience of description, let the post-bridge input signal before adjustment be the initial post-bridge input signal Vin_ac1, and let the adjusted post-bridge input signal be the final post-bridge input signal Vin_ac2. Using the current sampling signal I_Bleed of this embodiment to discharge the parasitic capacitance in the power system can fill up the defect caused by the distortion at the valley-bottom of the initial post-bridge input signal Vin_ac1. This allows the initial post-bridge input signal Vin_ac1 in a distorted state to be processed and adjusted to an undistorted final post-bridge input signal Vin_ac2 with a full sinusoidal envelope. That is to say, the initial post-bridge input signal Vin_ac1 that does not have a complete positive steamed bread waveform can be adjusted to become the final post-bridge input signal Vin_ac2 with a complete positive steamed bread waveform. Among them, the small value and the large value of the current sampling signal I_Bleed are obtained by relative comparison in the same waveform, and are used to distinguish the difference between the magnitudes of the current sampling signal I_Bleed in the same waveform. Similarly, the same applies to the small value and the large value of the bleeder current reference signal V1.

The circuit structure of the bleeder signal generating circuit may be determined according to actual requirements in other embodiments, and is not limited to this embodiment.

It should be understood that, since this embodiment does not involve load modulation, the problem of different power supply voltages at the VDD terminal caused by different loads will not occur in this embodiment. Therefore, this embodiment avoids the problem that the bleeder current (i.e., the current sampling signal I_Bleed) cannot work all the time and for a long time. Therefore, the bleeder current (i.e., the current sampling signal I_Bleed) in this embodiment can work full-time and for a long time, so that the zero-crossing signal can be accurately given in the power frequency period when the bleeder current (i.e., the current sampling signal I_Bleed) is enabled, and finally fully realize the function of giving full-time zero-crossing signal.

To sum up, the technical key points of this embodiment are: first, according to the waveform characteristics of the initial post-bridge input signal Vin_ac1, a bleeder current reference signal V1 is obtained by shaping, and its waveform forms an inverse relation with the wave of the initial post-bridge input signal Vin_ac1; second, select the current sampling signal I_Bleed that outputs the same waveform as the bleeder current reference signal V1. This technical key points enable the current sampling signal I_Bleed of this embodiment to follow the periodic change of the initial post-bridge input signal Vin_ac1 to realize cycle-by-cycle control.

By using the current sampling signal I_Bleed, which can be controlled periodically, to bleed the parasitic capacitance of the power system, it can fill the defect of the valley-bottom distortion part of the positive steamed bread waveform of the initial post-bridge input signal Vin_ac1, and provide the power system with a reliable and full-time sinusoidal wave envelope signal. That is to provide the final post-bridge input signal Vin_ac2 with a complete positive steamed bread waveform, so as to reduce the loss caused by the bleeder current (i.e., the current sampling signal I_Bleed) to the power system. In addition, this embodiment can also provide a relatively accurate turn-on signal for the switching transistor Q1, so that the zero-crossing signal can be given in full time and accurately.

Embodiment 2

This embodiment discloses a bleeder current control method according to the bleeder current control circuit in the embodiment 1, which is applied to the processing of distorted state input signals in a power system without bridge capacitors during valley-bottom chopping to transfer energy.

Figure 5:
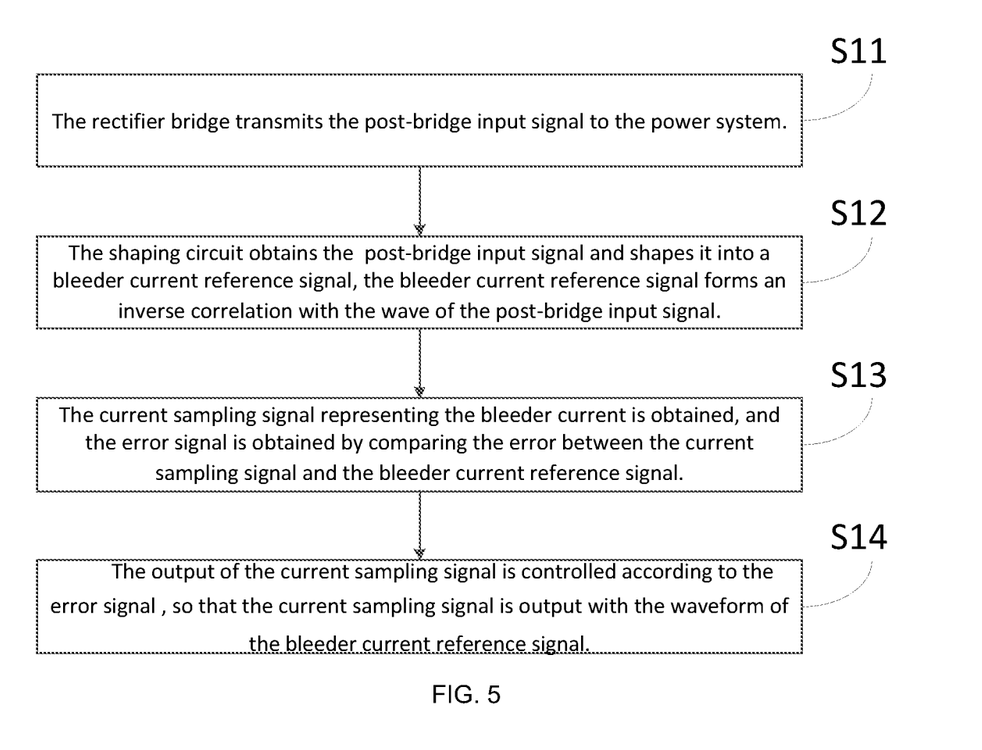
FIG. 5 illustrates a schematic flowchart of a bleeder current control method in the Embodiment 2.

The circuit structure of this embodiment refers to FIG. 2, and the waveform change refers to FIG. 3. As shown in the process of FIG. 5, it includes the following steps:

Step S11: The rectifier bridge 400 transmits the post-bridge input signal (i.e., Vin_ac1 in FIG. 2) to the power system. The Drain terminal of the power system obtains the post-bridge input signal transmitted by the rectifier bridge 400. At this time, the waveform of the post-bridge input signal is a positive steamed bread waveform. However, due to the existence of the parasitic capacitance between the Drain terminal and the ground, the actual waveform of the post-bridge input signal (i.e., Vin_ac1 in FIG. 3) is not an ideal sine wave envelope. As shown in FIG. 3, there is distortion in the valley-bottom position of the positive steamed bread waveform of the post-bridge input signal (i.e., Vin_ac1 in FIG. 3).

Step S12: The shaping circuit 100 obtains the post-bridge input signal (i.e., Vin_ac1 in FIG. 2 and FIG. 3) and shapes it into a bleeder current reference signal V1. The post-bridge input signal is input from the Drain terminal of the power system to the shaping circuit 100 for shaping, and the shaping circuit 100 outputs the shaped bleeder current reference signal V1.

The waveform of the bleeder current reference signal V1 is the same as the waveform of the current sampling signal I_Bleed in FIG. 3. The waveform of the current sampling signal I_Bleed in FIG. 3 is adjusted based on the waveform of the bleeder current reference signal V1. Since the bleeder current reference signal V1 is obtained by shaping the post-bridge input signal (i.e., Vin_ac1 in FIG. 3), the bleeder current reference signal V1 changes cycle by cycle following the cycle change of the post-bridge input signal. Therefore, the current sampling signal I_Bleed is also controlled cycle by cycle following the cycle change of the post-bridge input signal (i.e., Vin_ac1 in FIG. 3).

In this embodiment, the bleeder current reference signal V1 forms an inverse correlation with the wave of the post-bridge input signal (i.e., Vin_ac1 in FIG. 3). In the high-voltage range of the post-bridge input signal (i.e., Vin_ac1 in FIG. 3), the corresponding bleeder current reference signal V1 is a small value. In this embodiment, the bleeder current reference signal is a tiny current value between 20 uA and 30 uA. In the low-voltage range of the post-bridge input signal (i.e., Vin_ac1 in FIG. 3), the corresponding bleeder current reference signal V1 is a large value. Moreover, in this embodiment, the bleeder current reference signal V1 increases as the post-bridge input signal decreases, and decreases as the post-bridge input signal increases. The bleeder current reference signal V1 increases with the decrease of the post-bridge input signal, and the amplitude of its change meets certain requirements. This certain requirement makes the current sampling signal I_Bleed obtained after the final proofreading has the following characteristics: it can sinusoidalize the valley-bottom of the post-bridge input signal.

Step S13: The current sampling signal I_Bleed representing the bleeder current is obtained, and the error signal V2 is obtained by comparing the error between the current sampling signal I_Bleed and the bleeder current reference signal V1. As shown in FIG. 2 in the embodiment 1, the error signal V2 is output after the current sampling signal I_Bleed and the bleeder current reference signal V1 are compared by the comparator 300 for error. The way of generating the current sampling signal I_Bleed is not limited to one way. This embodiment focuses on the processing of the current sampling signal I_Bleed rather than the generation method of the current sampling signal I_Bleed, so the method or related circuit for generating the current sampling signal I_Bleed may have a method or related circuit structure suitable for the actual requirements of other embodiments in other embodiments.

Step S14: The output of the current sampling signal I_Bleed is controlled according to the error signal V2, so that the current sampling signal I_Bleed is output with the waveform of the bleeder current reference signal V1. That is, the on and off of the switching transistor Q1 is controlled by the error signal V2, thereby controlling the output of the current sampling signal I_Bleed. Therefore, after the error comparison of the comparator 300, the waveforms of the current sampling signal I_Bleed and the bleeder current reference signal V1 controlled and output by the switching transistor Q1 are consistent. That is, the current sampling signal I_Bleed maintains the waveform state shown in FIG. 3 when outputting.

In this embodiment, as shown in FIG. 3, the current sampling signal I_Bleed has a waveform that forms an inverse correlation with the waveform of the post-bridge input signal due to the reference calibration of the bleeder current reference signal V1. Wherein, the current sampling signal I_Bleed is at a first current value I1 when the post-bridge input signal is higher than a first voltage, and the first current value I1 is maintained at a stable current value; the current sampling signal I_Bleed is at a second current value I2 when the post-bridge input signal is lower than a second voltage, wherein the first voltage is higher than the second voltage, and wherein the first current value I1 is smaller than the second current value I2. In this embodiment, when the post-bridge input signal is higher than the first voltage, it is considered that the post-bridge input signal at this time is in the high voltage range; when the post-bridge input signal is lower than the second voltage, it is considered that the post-bridge input signal at this time is in the low voltage range. In the range corresponding to the high voltage interval of the post-bridge input signal, the current sampling signal I_Bleed is the first current value I1 with a small value. In the range corresponding to the low voltage interval of the post-bridge input signal, the current sampling signal I_Bleed is the second current value I2 with a large value. Wherein, as shown in FIG. 3, the first current value I1 is maintained at a stable current value, and the stable current value in this embodiment is selected as a small current value between 20 uA and 30 uA. In other embodiments, other specific values can be selected for the stable current value according to actual requirements, such as selecting a tiny current of several tens of microamps. The second current value I2 increases as the post-bridge input signal (i.e., Vin_ac1 in FIG. 3) decreases, and decreases as the post-bridge input signal increases.

It should be understood that, as shown in FIG. 3, the first current value I1 is stable at a relative minimum value (a small current value between 20 uA and 30 uA in this embodiment) in the entire current sampling signal I_Bleed period. In this embodiment, the variation amplitude of the second current value I2 is controlled according to the distortion amplitude of the waveform of the post-bridge input signal (i.e., Vin_ac1 in FIG. 3) at the valley-bottom. The magnitude of the increase of the second current value I2 with the decrease of the post-bridge input signal (i.e., Vin_ac1 in FIG. 3) is aimed at sinusoidalizing the valley-bottom of the post-bridge input signal (i.e., Vin_ac1 in FIG. 3). That is, the change range of the second current value I2 is aimed at that the positive steamed bread waveform of the post-bridge input signal (i.e., Vin_ac1 in FIG. 3) can satisfy the sine wave envelope even at the valley-bottom. Therefore, both the variation range of the second current value I2 and the maximum value of the second current value I2 (I_Bleed_max) need to be determined according to the actual distortion of the valley-bottom voltage waveform of the post-bridge input signal (i.e., Vin_ac1 in FIG. 3). In other embodiments, the maximum value of the second current value I2 (I_Bleed_max) may have no upper limit according to the different severity of the valley-bottom distortion of the waveform of the post-bridge input signal (i.e., Vin_ac1 in FIG. 3).

In this embodiment, the starting point of the current sampling signal I_Bleed needs to be determined according to the waveform of the post-bridge input signal (i.e., Vin_ac1 in FIG. 3). And the starting point of the current sampling signal I_Bleed needs to be selected with the goal of not turning on the current sampling signal I_Bleed when the post-bridge input signal (i.e., Vin_ac1 in FIG. 3) is within the range corresponding to the high-voltage range. This is because there is no distortion in the high-voltage range of the post-bridge input signal (i.e., Vin_ac1 in FIG. 3), and only the low-voltage range has distortion. Therefore, in other embodiments, according to actual needs, it is necessary to reasonably select the voltage of the post-bridge input signal (i.e., Vin_ac1 in FIG. 3) corresponding to the starting point of the current sampling signal I_Bleed. That is to say, the loss caused by the current sampling signal I_Bleed can be effectively reduced by reasonably selecting the positive steamed bread waveform corresponding to the starting point of the current sampling signal I_Bleed.

To sum up, the method of controlling the output of the current sampling signal I_Bleed in this embodiment is as follows: firstly shape the post-bridge input signal (i.e., Vin_ac1 in FIG. 2 and FIG. 3) into the bleeder current reference signal V1, and then control the switching transistor Q1 to turn-on (or turn-off) by comparing the error between the current sampling signal I_Bleed and the post-bridge input signal (i.e., Vin_ac1 in FIG. 2 and FIG. 3), and finally control the output of the current sampling signal I_Bleed according to the turn-on (or turn-off) of the switching transistor Q1. In this embodiment, the output current sampling signal I_Bleed can maintain the waveform of the bleeder current reference signal V1. And this embodiment can achieve the purpose that the current sampling signal I_Bleed can be controlled periodically with the change of the post-bridge input signal (i.e., Vin_ac1 in FIG. 2 and FIG. 3).

Embodiment 3

Figure 4:
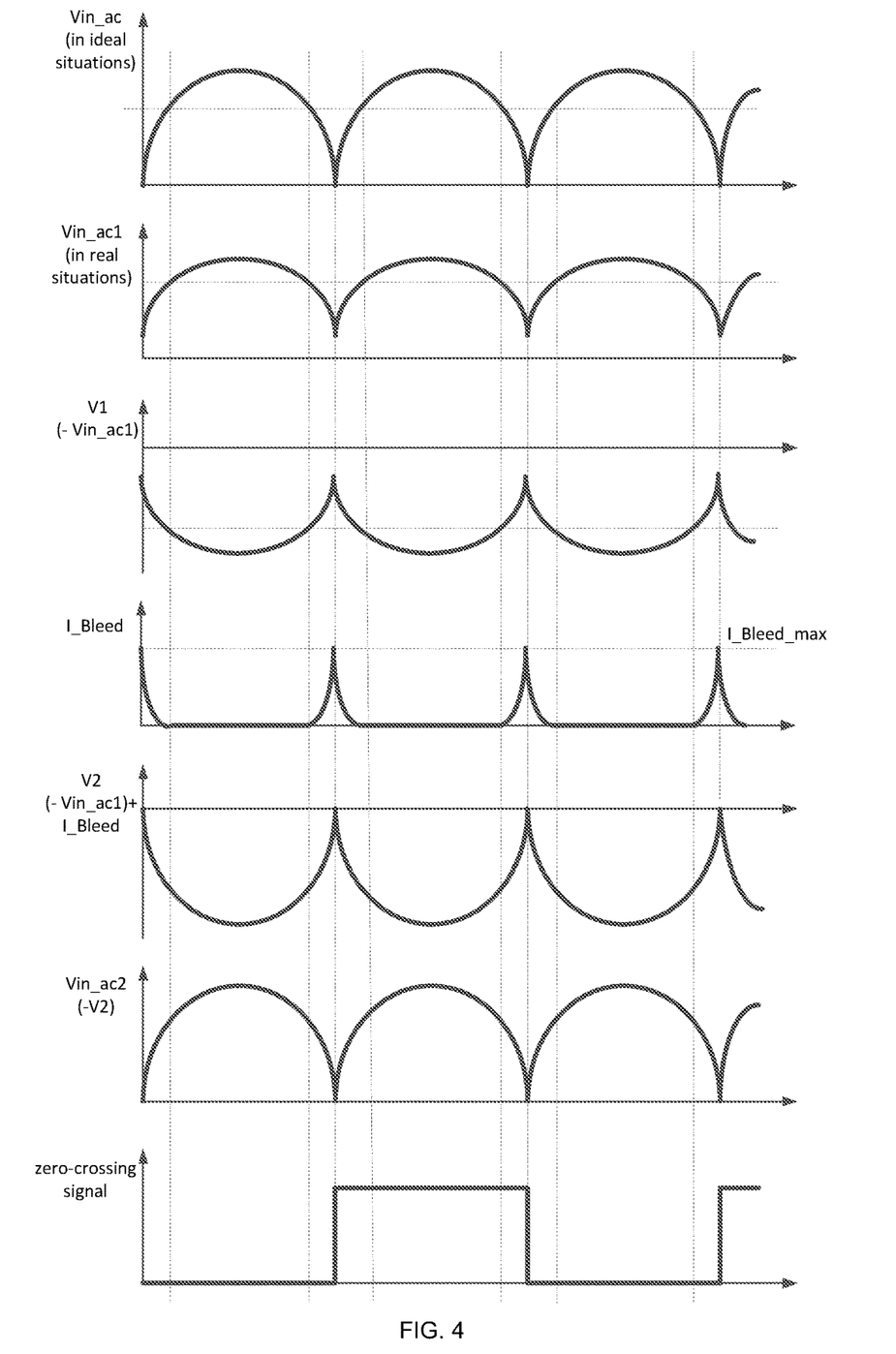
FIG. 4 illustrates a simplified schematic diagram of waveform changes of each signal in the Embodiment 3.

This embodiment discloses another bleeder current control method. As shown in FIG. 4, on the basis of the embodiment 2, in this embodiment, the current sampling signal I_Bleed is maintained at the stable current value at the rising edge stage of the post-bridge input signal, and the current sampling signal I_Bleed is enabled at the falling edge stage of the post-bridge input signal. Specifically, in this embodiment, the current sampling signal I_Bleed maintained at the rising edge stage of the post-bridge input signal is zero, which can be understood as shielding the current sampling signal I_Bleed at this time. That is, the shaping result of the post-bridge input signal in step S13 is: at the rising edge position of the post-bridge input signal (i.e., Vin_ac1 in FIG. 4), the bleeder current reference signal V1 is maintained at the stable current value (i.e., V1 is shielded); at the falling edge position of the post-bridge input signal, the bleeder current reference signal V1 maintains the waveform that increases with the decrease of the post-bridge input signal in the embodiment 2.

In the non-inductor chip architecture after the bridge, the rectification distortion of the post-bridge input signal only occurs in the falling edge interval, while the rising edge interval of the post-bridge input signal can achieve no distortion of the sine wave. That is, at the valley-bottom position of the positive steamed bread waveform of the post-bridge input signal, only the falling edge position has distortion, and there is no distortion at the rising edge position.

Therefore, in this embodiment, the current sampling signal I_Bleed is shielded at the rising edge position of the post-bridge input signal (i.e., the initial post-bridge input signal Vin_ac1 in FIG. 4), and the valley-bottom distortion of the post-bridge input signal (i.e., the initial post-bridge input signal Vin_ac1 in FIG. 4) can be controlled cycle by cycle using the current sampling signal I_Bleed. In the above manner, this embodiment can make the post-bridge input signal (i.e., the final post-bridge input signal Vin_ac2 in FIG. 4) have a complete positive steamed bread waveform. This embodiment can also optimize the power consumption problem caused by using the current sampling signal I_Bleed. Specifically, this embodiment reduces power consumption by shielding the current sampling signal I_Bleed at the rising edge position of the post-bridge input signal (i.e., the initial post-bridge input signal Vin_ac1 in FIG. 4).

In other embodiments, when the parasitic capacitance behind the bridge is particularly large, the present invention may also adopt a method of superimposing a small component of DC bias current on the basis of the current sampling signal I_Bleed. This method can avoid the situation that the current sampling signal I_Bleed cannot work normally due to serious distortion of the post-bridge input signal.

Embodiment 4

Figure 6:
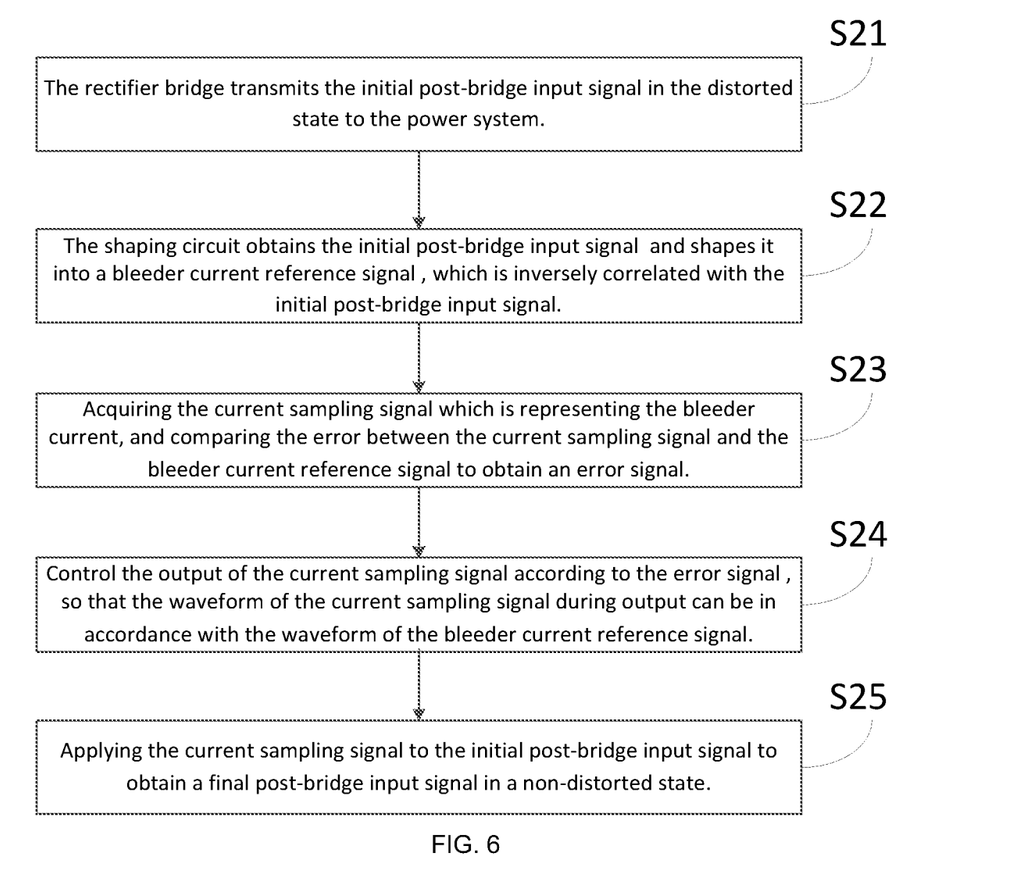
FIG. 6 illustrates a schematic flowchart of a bleeder current control method in the Embodiment 4.

This embodiment discloses a distortion signal processing method, which is used for processing an input signal in a distortion state by a power system. In this embodiment, the bleeder current control method in the embodiment 2 is used to control the bleeder current, so as to adjust the post-bridge input signal (i.e., the initial post-bridge input signal Vin_ac1 in FIG. 3) in a distorted state to an undistorted post-bridge input signal (i.e., the final post-bridge input signal Vin_ac2 in FIG. 3). That is, this embodiment can adjust the initial post-bridge input signal Vin_ac1 of the positive steamed bread waveform with an incomplete sine wave envelope to the final post-bridge input signal Vin_ac2 of the positive steamed bread waveform with a complete sinusoidal envelope. As shown in FIG. 3 and FIG. 6, it specifically includes the following steps:

Step S21: The rectifier bridge transmits the initial post-bridge input signal Vin_ac1 in the distorted state to the power system.

Step S22: The shaping circuit 100 obtains the initial post-bridge input signal Vin_ac1 and shapes it into a bleeder current reference signal V1, which is inversely correlated with the initial post-bridge input signal Vin_ac1.

Step S23: Acquiring the current sampling signal I_Bleed which is representing the bleeder current, and comparing the error between the current sampling signal I_Bleed and the bleeder current reference signal V1 to obtain an error signal V2.

Step S24: Control the output of the current sampling signal I_Bleed according to the error signal V2, so that the waveform of the current sampling signal I_Bleed during output can be in accordance with the waveform of the bleeder current reference signal V1.

Step S25: Applying the current sampling signal I_Bleed to the initial post-bridge input signal Vin_ac1 to obtain a final post-bridge input signal Vin_ac2 in a non-distorted state. The current sampling signal I_Bleed discharges the parasitic capacitance in the power system, so that the waveform of the valley-bottom of the initial post-bridge input signal Vin_ac1 is sinusoidal, thereby obtaining the final post-bridge input signal Vin_ac2.

To sum up, this embodiment discharges the parasitic capacitance by using the current sampling signal I_Bleed which is inversely correlated with the wave of the initial post-bridge input signal Vin_ac1, so as to fill the defect of the valley-bottom distortion part of the positive steamed bread wave of the initial post-bridge input signal Vin_ac1. Therefore, this embodiment can provide the power system with the final post-bridge input signal Vin_ac2 which is having a complete positive steamed bread waveform, thereby reducing the loss caused by the current sampling signal I_Bleed to the power system.

In addition, since the waveform shown in FIG. 3 is a waveform without load modulation, the waveform in this embodiment should be regarded as a waveform when the VDD terminal of the power system has sufficient power supply when the load is no-load. This is also the waveform when the main transistor is not turned on for a long time. When the switching transistor Q1 is turned on, the existence of the post-bridge input signal and the current sampling signal I_Bleed do not conflict. Since the continuous enabling of the current sampling signal I_Bleed can provide a relatively accurate turn-on signal for turning on the switching transistor Q1, the zero-crossing signal can be given in full time and accurately. In addition, the zero-crossing signal used in FIG. 3 and FIG. 4 of this embodiment is a square wave. However, in other embodiments, the zero-crossing signal may also be a pulse wave, which is not limited to this embodiment.

At the same time, the current sampling signal I_Bleed used in this embodiment has the characteristics of linear gradient and slow increase, and the Drain terminal of the power system is directly close to the rectifier bridge 400. These characteristics make the linearly increasing speed of the current sampling signal I_Bleed in this embodiment more slowly, which is more helpful for EMI suppression. Compared with the traditional method of intermittently providing the current sampling signal I_Bleed intermittently, this embodiment can be more friendly to EMC performance.

Finally, it should be noted that the above embodiments are only used to illustrate the technical solutions of the present invention, but not to limit them. Although the present invention has been described in detail with reference to the foregoing embodiments, it should be understood by those of ordinary skill in the art that: it is still possible to modify the technical solutions recorded in the foregoing embodiments, or perform equivalent replacements to some of the technical features; and these modifications or replacements do not make the essence of the corresponding technical solutions depart from the scope of the technical solutions of the embodiments of the present invention.

In a word, the above are only preferred embodiments of the present invention, and all equivalent changes and modifications made according to the scope of the patent application of the present invention shall fall within the scope of the patent of the present invention.

We claim:

1. A bleeder current control method for processing an input signal input into a power system, the method comprising:
   providing a post-bridge input signal to the power system;
   shaping the post-bridge input signal into a bleeder current reference signal, wherein the bleeder current reference signal is inversely correlated with the post-bridge input signal;
   obtaining a current sampling signal representing a bleeder current, and comparing the current sampling signal with the bleeder current reference signal to obtain an error signal;
   controlling the current sampling signal according to the error signal, so that the current sampling signal follows waveform of the bleeder current reference signal, and wherein
   the current sampling signal is at a first current value when the post-bridge input signal is higher than a first voltage, and the first current value is maintained at a stable current value;
   the current sampling signal is at a second current value when the post-bridge input signal is lower than a second voltage, wherein the first voltage is higher than the second voltage, and wherein the first current value is smaller than the second current value.

2. The bleeder current control method according to claim 1, wherein, when the post-bridge input signal is lower than the second voltage, the second current value increases as the post-bridge input signal decreases.

3. The bleeder current control method according to claim 2, wherein, when the post-bridge input signal is lower than the second voltage, the second current value also decreases as the post-bridge input signal increases.

4. The bleeder current control method according to claim 2, wherein, the current sampling signal is maintained at the stable current value at a rising edge stage of the post-bridge input signal, and the current sampling signal is enabled at a falling edge stage of the post-bridge input signal.

5. The bleeder current control method according to claim 4, wherein a DC bias current is superimposed on the current sampling signal.

6. The bleeder current control method according to claim 1, wherein,
   controlling the current sampling signal via controlling a switching transistor by the error signal;
   when the error signal is less than a conduction voltage drop of the switching transistor, the switching transistor is not turned on;
   when the error signal is not less than the conduction voltage drop of the switching transistor, the switching transistor is turned on.

7. A distortion signal processing method for processing an input signal in a distorted state by a power system, comprising:
   providing a rectifier bridge transmitting a post-bridge input signal in the distorted state to the power system;
   obtains obtaining the post-bridge input signal and shaping it into a bleeder current reference signal by a shaping circuit, and the bleeder current reference signal is inversely correlated with the post-bridge input signal;
   acquiring a current sampling signal representing a bleeder current, and comparing the current sampling signal with the bleeder current reference signal to obtain an error signal;

controlling the current sampling signal according to the error signal, so that the current sampling signal follows waveform of the bleeder current reference signal;

the current sampling signal is used to control a current which discharges a parasitic capacitance, so as to obtain the post-bridge input signal in a state of no distortion, and wherein the current sampling signal is at a first current value when the post-bridge input signal is higher than a first voltage, and the first current value is maintained at a stable current value;

the current sampling signal is at a second current value when the post-bridge input signal is lower than a second voltage, wherein the first voltage is higher than the second voltage, and wherein the first current value is smaller than the second current value.

8. A bleeder current control circuit in a power system, the bleeder current control circuit comprising:

a switching transistor;

a shaping circuit configured to obtain a post-bridge input signal input into the power system, and shape the post-bridge input signal into a bleeder current reference signal;

a comparator having a first input terminal coupled to the shaping circuit, a second input terminal, and an output terminal coupled to a control terminal of the switching transistor; and a bleeder signal generating circuit coupled to the switching transistor to generate a current sampling signal for representing a bleeder current flowing through the switching transistor, and the current sampling signal is fed back to the second input terminal, and wherein the current sampling signal is at a first current value when the post-bridge input signal is higher than a first voltage, and the first current value is maintained at a stable current value;

the current sampling signal is at a second current value when the post-bridge input signal is lower than a second voltage, wherein the first voltage is higher than the second voltage, and wherein the first current value is smaller than the second current value.

9. The bleeder current control circuit according to claim 8, wherein the first input terminal is a non-inverting input terminal, and the second input terminal is an inverting input terminal.

* * * * *